July 12, 1927.

J. HIRSHSTEIN 1,635,842

CHECK VALVE

Filed Sept. 20, 1924

Inventor

Joseph Hirshstein

By Bates, Macklin, Goldrick & Teare

Attorneys

Patented July 12, 1927.

1,635,842

UNITED STATES PATENT OFFICE.

JOSEPH HIRSHSTEIN, OF CLEVELAND HEIGHTS, OHIO.

CHECK VALVE.

Application filed September 20, 1924. Serial No. 738,833.

This invention is concerned with check valves, and more particularly with check valves of the flapper type, and the general object thereof is to provide a sensitive valve mechanism which may be manufactured in a simple and economical manner.

A more specific object of my invention is to provide in a check valve a novel double pivot bearing construction for a check member which will remain normally unseated to permit circulation in a piping system in which the valve is installed and particularly when only a minimum pressure prevails due to the convective action of the water, but which will become accurately seated when the pressure in the system on both sides of the valve becomes materially unbalanced in an opposite direction.

Other objects of my invention will hereinafter be set forth in the following specification referring to the accompanying drawings illustrating the preferred form thereof. The essential characteristics are summarized in the claims.

Figure 1:
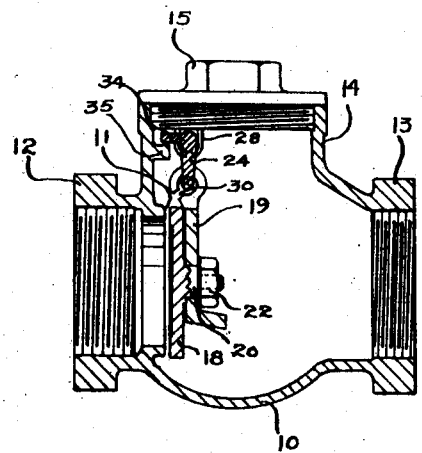
Figure 2:
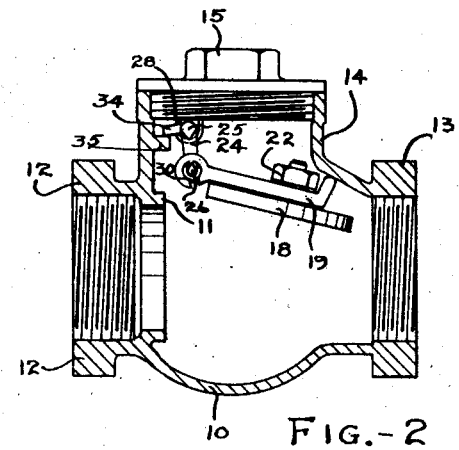
Figure 3:
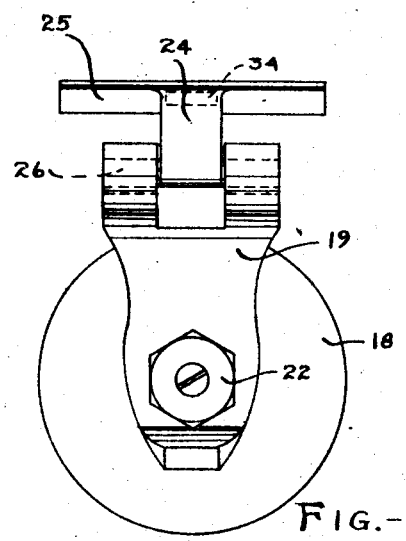
Figure 4:
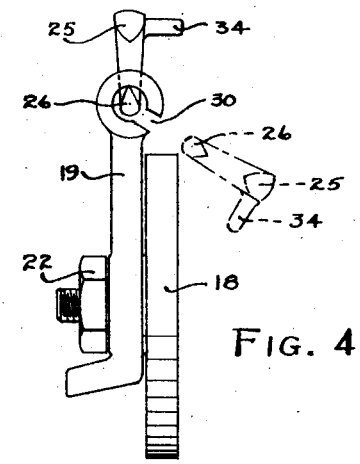
Figure 5:

In the drawings, Fig. 1 is a cross sectional view taken through the valve body when the check member is normally in unseated position; Fig. 2 is a similar cross sectional view showing the position of the check member when an unusual circulatory movement of the water is taking place in the system in which it is installed; Fig. 3 is an enlarged sectional view of the check member and a supporting bearing member therefor; Fig. 4 is a side elevational view of the bearing member and the check member; Fig. 5 is a fragmentary perspective view of a bearing lug formed on the body member of the valve.

My invention contemplates a valve construction for checking the flow of water in a system in one direction while permitting the flow of water in the opposite direction, without necessitating an actuation of the flapper member to open the valve; the check member being suspended in a normally unseated position. The bearing for the check member is in the nature of a double pivot suspension, whereby the check member will readily respond to any flow of the water in the system in which the valve member is installed under an extremely low pressure.

As shown in the drawings, I provide the usual valve body member 10 with an interiorly disposed annular seat portion 11 which is concentric with threaded branch portions 12 and 13. A branch portion 14 is provided to permit access to the interior of the valve body when once installed and this branch portion is closed by a threaded cap member 15 which also serves to retain suspension means for the check member in operative position as will be hereinafter set forth.

The valve check member may comprise a disc 18 which is supported on a swingable arm 19 and may be provided with a stud portion 20 loosely fitting in a suitable bore formed in the lower end of the arm 19, whereby the disc 18 is free to rotate relative to the valve body seat 11. The check disc may be maintained in proper relation to the arm 19 by any suitable means such as a nut 22 bearing on a suitable shoulder formed on the stud portion of the disc.

To afford a very sensitive suspension for the arm 19 whereby the disc member may respond to any slight convective movement of the water in the system, I provide a bearing member 24 comprising essentially an upper fulcrum bar 25 and a shorter lower fulcrum bar 26. The fulcrum bars have the opposed bearing edges thereof shaped to form a line contact. The valve body 10 is provided with hollow bearing lugs 28 which are shaped to support the ends of the fulcrum bar 25, and the location of the lugs is such that the disc 18 will be suspended in a normally unseated position whereby the valve is normally open. These lugs are also in such position that the tops thereof may be adjacent the inner edge of the closure cap whereby the cap will maintain the bearing member in operative position. The upper end of the arm 19 is bifurcated as shown in Fig. 3 whereby the fulcrum bar 26 may bear in a bore formed in the bifurcated portion of the arm. The bearing 24 is preferably formed to comprise a casting with the fulcrum bars formed integrally therewith and I accordingly provide slots 30 in the arm 19 as shown in Fig. 4 whereby the bar 36 may be readily positioned in the bored openings formed in the bifurcated portions of the arm. The position of these slots relative to the seating position of the disc 18 is such as to extend toward the valve seat of the body, whereby when the valve check 18 is swung to a full open position as shown in Fig. 2, the fulcrum edges of the bar 26, the possibility of the arm 19 becoming operatively displaced relative to the bearing member 24 is eliminated.

To decrease the length of the radial swing of the disc 18, the movement of the bearing member 24 is limited so that major portion of the arm swing is about the fulcrum bar 26, whence the amount of clearance therefor, and incidently the size of the body may be decreased, I provide a stop lug 34 on the member 24 which is adapted to contact with a suitably positioned lug 35 extending from the wall of the branch 14 to limit the movement of the fulcrum member 24.

From the foregoing description of my invention, it will be seen that I have provided a check valve construction of the flapper type wherein the check member is afforded a double pivotal suspension, maintaining the check member normally in an unseated position whereby a slow movement of the water through the check valve may take place without necessitating unseating of the valve. The parts may be readily assembled for purposes of cleaning without necessitating removal of pins or screws. The bearing construction is such that the swinging movement of the means supporting the check member tends to maintain the bearing surfaces in a clean condition regardless of the accumulation of sludge and other foreign matter on the bearing surfaces for movable parts of the valve. Furthermore, even though the valve parts may be readily taken apart manually, without necessitating the use of tools, the arrangement is such that movable members of the valve mechanism may all be maintained in a cooperative relation with the possibility of becoming displaced eliminated.

Having thus described my invention, I claim:

1. In a check valve, the combination of a valve body having opposed threaded ends and a concentric valve seat, a closed branch, a cap closing the branch, a valve check member, an arm swingably mounted within the branch and pivotally supporting the valve check member, a fulcrum bearing member mounted in the throat of the branch and affording a double pivotal suspension for the arm and suspending the valve closure member in relation to the valve body seat, an extension formed on the fulcrum member and a projection on the throat of the branch adapted to cooperate with said extension thereby limiting the swingable movement of the fulcrum member thereof in the direction of open position.

2. In a check valve of the character described, the combination of a valve body having a seat formed concentrically of closed threaded ends of the valve body, a valve check member, an arm supporting the check member, a double bearing fulcrum member suspended in the throat of a branch of the valve body, the arm having a bifurcated upper end, said bifurcated end being slotted in a direction to extend toward the seat of the valve body for permitting the assembly of the fulcrum member and the arm.

3. In combination, a valve body having a valve seat, a branch, a valve check member, said branch having bearing lugs extending from the throat thereof, an arm swingably mounted within the branch supporting the valve check member, a fulcrum bearing member mounted in said lugs and affording a double pivotal suspension for the arm and suspending the valve closure member, an extension formed on the fulcrum member and a projection on the throat of the branch adapted to cooperate with said extension thereby limiting the movement of said fulcrum bearing member.

4. In a check valve the combination of a valve body having opposed threaded ends and a concentric valve seat, a closed branch, a cap closing the branch, upwardly facing lugs extending inwardly within the throat of said branch and being positioned adjacent said cap, a bearing member adapted to be carried by said lugs and retained in said lugs by said cap, an extension formed on the bearing member and a projection on the throat of the branch adapted to cooperate with said extension thereby limiting the movement of said bearing member, a valve check member and means for loosely suspending said valve check member from said bearing member.

5. In combination, a valve body having a valve seat, a branch, a valve closure member, said branch having bearing portions extending from the throat thereof, an arm swingably mounted within the branch supporting the valve closure member, a fulcrum bearing member supported in said bearing portions and affording a double pivotal suspension for the arm and suspending the valve closure member, an extension formed on the fulcrum member and adapted to cooperate with a fixed portion of the throat of the branch, thereby limiting the movement of said fulcrum bearing member.

In testimony whereof, I hereunto affix my signature.

JOSEPH HIRSHSTEIN.